United States Patent [19]

Franke et al.

[11] Patent Number: 5,485,378
[45] Date of Patent: Jan. 16, 1996

[54] DEVICE FOR STEERING A VEHICLE WITH CONTROLLED COURSE HOLDING

[75] Inventors: Uwe Franke, Uhingen; Stefan Hahn, Denkendorf; Avshalom Suissa, Renningen, all of Germany

[73] Assignee: Daimler-Benz AG, Germany

[21] Appl. No.: 313,981

[22] Filed: Sep. 27, 1994

[30] Foreign Application Priority Data

Sep. 27, 1993 [DE] Germany .......................... 43 32 836.9

[51] Int. Cl.⁶ .............................................. G06F 165/00
[52] U.S. Cl. ............... 364/424.05; 348/118; 364/424.02
[58] Field of Search ....................... 364/424.02, 424.05, 364/424.01; 180/167–169, 234, DIG. 3, 142; 318/587, 576; 348/118

[56] References Cited

U.S. PATENT DOCUMENTS

| | | | |
|---|---|---|---|
| 4,088,939 | 5/1978 | Mitschke et al. | 318/576 |
| 4,176,728 | 12/1979 | Otteblad et al. | 180/168 |
| 5,163,002 | 11/1992 | Kurami | 364/424.02 |
| 5,234,070 | 8/1993 | Noah et al. | 180/169 |
| 5,245,422 | 9/1993 | Borcherts et al. | 348/118 |
| 5,289,893 | 3/1994 | Yamamoto et al. | 180/132 |
| 5,318,143 | 6/1994 | Parker et al. | 180/168 |
| 5,357,432 | 10/1994 | Margolis et al. | 364/424.02 |
| 5,373,911 | 12/1994 | Yasui | 180/168 |
| 5,390,118 | 2/1995 | Margolis et al. | 364/424.02 |

FOREIGN PATENT DOCUMENTS

3414891C2  10/1985  Germany .

OTHER PUBLICATIONS

U. Franke, Real time 3D-road modeling for autonomous vehicle guidance, Mercedes-Benz Research Institute, pp. 277–283; 1992.
British Search Report dated Nov. 30, 1994.

Primary Examiner—Michael Zanelli
Attorney, Agent, or Firm—Evenson, McKeown, Edwards & Lenahan

[57] ABSTRACT

A device for steering and maintaining the course of a vehicle contains, in addition to a device for detecting the position of the vehicle, and a steering control device which acts on a steering angle adjustment device, a preselectable limitation of the steering angle setting requested by the control. A steering angle setting requested by the control is combined with the steering angle setting requested by the driver, and the steering angle adjustment device sets the steering angle in accordance with this combination.

12 Claims, 2 Drawing Sheets

DEVICE FOR STEERING A VEHICLE WITH CONTROLLED COURSE HOLDING

BACKGROUND AND SUMMARY OF THE INVENTION

The invention relates to a device for steering a vehicle, especially a road vehicle, and for maintaining a controlled course, by means of a feedback type steering control mechanism.

In known experimental road vehicles of this kind, the position of the vehicle in relation to the road is detected (e.g., with video cameras) and on the basis of these data the steering of the vehicle on the road is controlled so that it maintains a specific course. Detection of the vehicle's position in relation to the underlying surface can be achieved by image analysis methods which determine the position of the vehicle in relation to the roadway from a sequence of video images. An image analysis method of this kind is described in U. Franke, Real time 3D-road modeling for autonomous vehicle guidance, Theory & Applications of Image Analysis, Hrsg. P. Johansen and S. Olsen, World Scientific, 1992.

Known steering control methods in experimental vehicles can be divided into two groups. In a first group the driver can switch between manual and automatic steering modes, the manual mode requiring normal steering wheel actuation by the driver, while in automatic mode (e.g., by means of a device of the generic type) the steering angle or the steering angle speed alone is prescribed by a steering control device without the driver's having a direct means of intervention. In the control method of the second group, a controller specifies a steering torque which is added to that applied by the driver; this arrangement is intended to give the driver information on the correct course, or even to realize largely automatic driving when the steering wheel is released.

A steering device of the latter kind is disclosed in German Patent Document DE 34 14 891 C2, in which switching over can occur between manual steering and automatic transverse guidance. The device for automatic transverse guidance is coupled to a hydraulic circuit of the driver actuated power steering system, so that in an emergency the driver can override the automatic transverse guidance. To do so, the driver must apply to the steering wheel a steering torque which is greater than that produced by the automatic transverse guidance control. In this process, automatic transverse guidance produces in each case a steering force value which corresponds completely to that value which is produced from the detected control deviation of the position of the vehicle.

One object of the present invention is to provide a device for steering and maintaining the course of a vehicle in which, on the one hand the driver retains his or her ability to intervene in the steering of the vehicle, (particularly for relatively large steering maneuvers), and which on the other hand relieves the driver largely of continuous steering intervention.

This problem is solved by the steering control according to the invention in which the steering angle setting device combines the steering setting requested by the control and the steering setting requested by the driver, with limitation of the steering angle adjustment requested by the control device. In this manner, it is possible for the driver on the one hand to retain control over relatively large changes in the vehicle steering (e.g., in order to carry out avoidance maneuvers or to change lanes), while on the other hand he or she is relieved of normally constant necessity of making small steering corrections on approximately straight or slightly curved sections of road. With this device, small steering movements to maintain a prescribed set position of the vehicle are carried out by the control device in a course-maintaining fashion, whilst the driver simultaneously retains the ability to perform relatively large steering movements which are combined with the steering behavior induced by the control. At the same time, a very uniform transition between purely manual control and purely automatic control is also achieved.

In a preferred embodiment of the invention, a distance which is to be maintained from a lane boundary, (such as a center strip of a roadway) serves as a set value for the position of the vehicle; and the instantaneous distance, the angle between the longitudinal axis of the vehicle and the tangent to the lane boundary and the curvature of the lane boundary are determined in each case in order to maintain the set value.

In another advantageous embodiment of the invention, the set distance to position the vehicle (i.e., distances from the lane boundary, set in particular by the driver in a preceding period) is adjusted so that during a journey, different set distances can be selected in accordance with the preceding driving behavior. According to a dynamic adjustment feature of the invention, the control is adapted to transitions between non-steady-state sections of a journey in a gliding fashion, e.g., before, during and after a lane changing process.

According to another feature of the invention, the steering-aid adjustment signal of the steering control device is divided into discrete intervals, so that the steering angle adjustment device can be constructionally simple and robust, particularly with respect to the connection between a control device provided there and the associated actuation means, or the actuation means themselves.

Very effective control intervention can be achieved by performing the steering adjustment requested by the control at the front axle of the vehicle in addition to the steering adjustment requested by the driver. In addition, it is also advantageous to provide for steering torque compensation to counteract the change in the restoring force exerted on the steering wheel by the tires due to operation of the controller, which is otherwise conveyed to the driver in an unpleasant manner.

According to yet another embodiment of the invention, steering adjustment, requested by the control, at the rear axle of the vehicle is also possible. Particularly when the vehicle is already equipped with electronic four-wheel steering, this arrangement simplifies the device in that it is then sufficient on the actuation element side to supplement the existing electronic control device with an additional input variable which specifies to the four-wheel steering system an additional steering angle to be implemented.

Other objects, advantages and novel features of the present invention will become apparent from the following detailed description of the invention when considered in conjunction with the accompanying drawings.

DETAILED DESCRIPTION OF THE DRAWINGS

Figure 1:
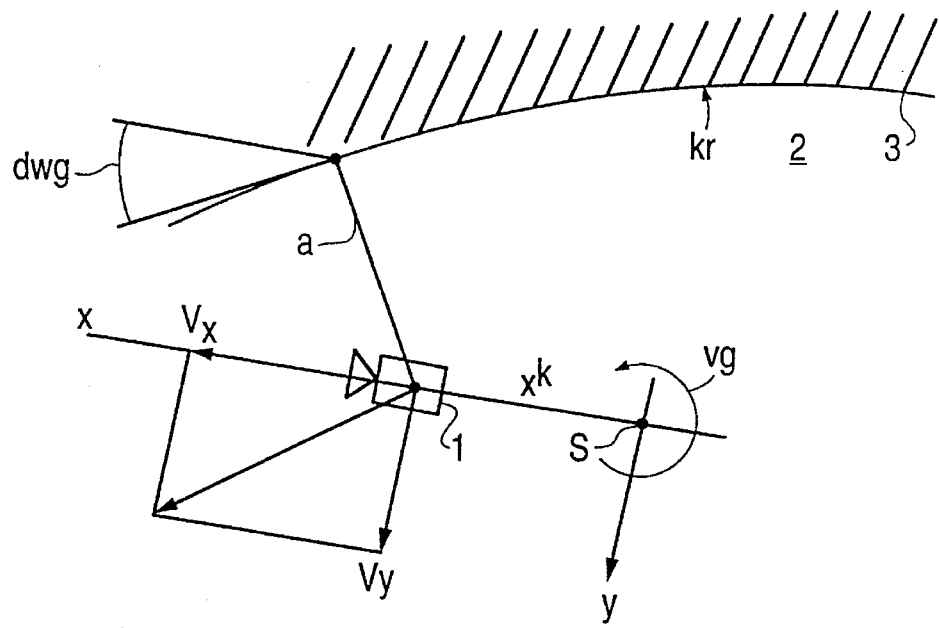
FIG. 1 is a diagrammatic illustration of a road vehicle equipped with a video image device on a roadway, and illustrates the parameters determining the position of the vehicle.

FIG. 1 illustrates the parameters used to determine the position of the vehicle. The vehicle, indicated by its centre of gravity (S), its longitudinal direction (x) and its transverse direction (y), is located on a lane (2) which has a boundary (3) with a curvature (kr). The vehicle is equipped with a video camera (1) with an image processing unit connected downstream, for detecting the position of the vehicle in relation to the roadway. The image processing unit automatically determines the quality of the recorded video images and determines from them the reliability of the acquired measurement values. A signal (which is not shown in greater detail) is emitted when the values drop below a prescribed reliability limit, which ensures that steering control intervention does not occur. In order to support the image processing under difficult peripheral conditions, the method can be supplemented by a precise electronic road map in a databank, in a manner which is known, per se.

The vehicle position detection device (1) determines the transverse distance (a) of the vehicle from the boundary (3) of the roadway, the curvature (kr) of the roadway and a yaw angle difference (dwg), the latter constituting the angle between the longitudinal direction (x) of the vehicle and the tangent to the boundary (3) of the lane. Furthermore, the description of the dynamics of the position of the vehicle includes the yaw (rotational) speed (vg) and the distance (xk) between the location of the camera (1) and the centre of gravity (S) of the vehicle. The control of the vehicle steering is based then on the two kinematic equations:

$$d(a)/dt = (v_x + vg \cdot a) \tan(dwg) + v_y - xk \cdot vg,$$

$$d(dwg)/dt = vg - v_x \cdot kr$$

and the two dynamic differential equations:

$$d(v_y)/dt = -v_x \cdot vg + (S_v \cos(wl) + S_h)/m + g \cdot ww,$$

$$d(vg)/dt = (1_v \cdot S_v \cos(wl) - 1_h \cdot S_h)/I_z$$

In addition to the foregoing variables, the term (ww) represents the (roll) angle between vehicle and inclination of the lane, ($S_v$) represents the front lateral force and ($S_h$) represents the rear lateral force, (g) represents the acceleration due to gravity, (m) represents the mass of the vehicle, ($I_z$) represents the inertia moment about the vertical axis, ($1_v$) and ($1_h$) represent the distance from the centre of gravity to the front and to the rear and (wl) represents the steering angle. The above equation system for the variables (a, dwg, $v_y$, vg) can be transformed in a conventional manner by a linear, time-dependent transformation into a standard control form whose exact form and parameter values depend, inter alia, on whether the steering control intervention takes place at the front axle or at the rear axle. In this standard control form, the determination of the control law is then simple. Various resulting concrete examples of steering controller interventions are subsequently explained in greater detail with reference to FIGS. 2 to 4.

Figure 2:
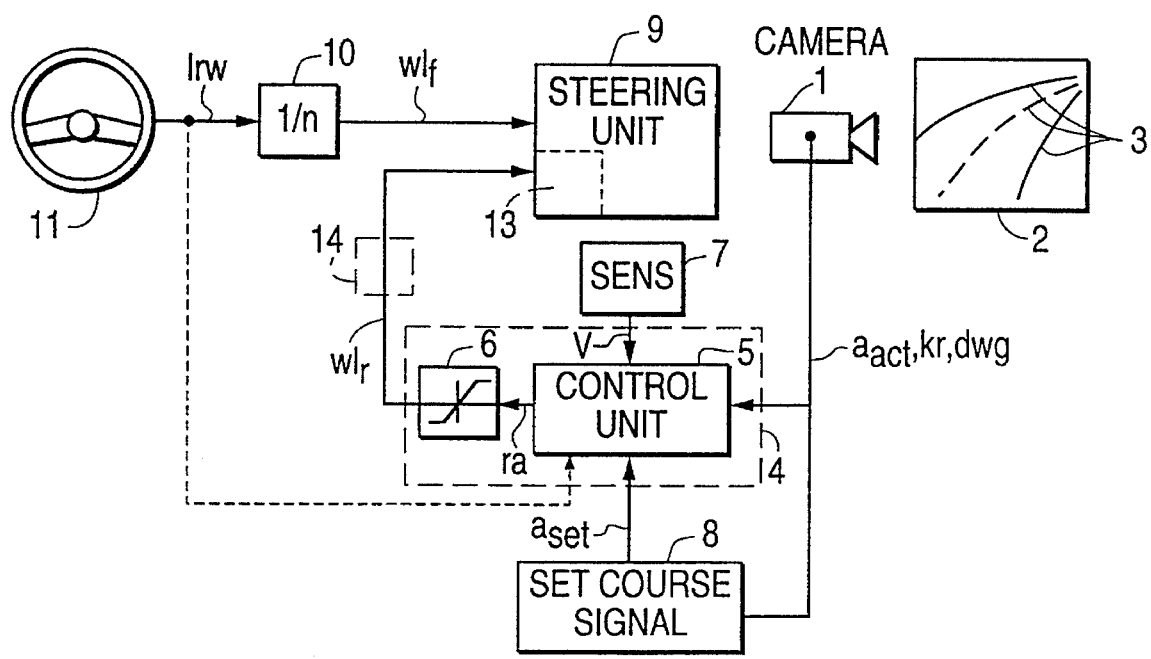
FIG. 2 is a block diagram of a steering control according to the invention, for a vehicle with electronic four-wheel steering, in which the steering control device acts on the steering angle of the rear axle.

In the device, shown in FIG. 2, for course maintaining vehicle steering, the sensor (such as a camera) (1) for detecting the position of the vehicle visually detects the lane (2), in particular by means of marks arranged on it at the sides, and evaluates the data obtained. The output signal of the sensor (1) contains the information on the actual distance ($a_{act}$) from the boundary (3) of the lane, the instantaneous curvature (kr) of the roadway and the instantaneous yaw angle difference (dwg). This information is fed on the one hand to a steering control device (4) and on the other hand to a set course signal transmitter (8).

The steering control device (4) contains a control unit (5) and a limiter (6) connected downstream. The control unit (5) receives vehicle position data from the sensor (1), as well as data relating to a set distance ($a_{set}$) to be maintained, from the set course signal transmitter (8), and a signal relating to the instantaneous speed (v) of the vehicle, which signal is emitted by a speed sensor (7). Additionally, the control unit (5) may also receive information relating to the steering wheel angle (lrw) set by the driver. (Since the supplying of this information is optional, the associated feed line is illustrated as a broken line.) The steering wheel angle (lrw) is also transformed by a steering translation unit (10) into a steering angle setting signal ($wl_f$) requested by the driver, which signal is itself fed to an electronic four-wheel steering unit (9) of the vehicle as a steering angle adjustment device.

From the input signals fed to it, the control unit (5) determines (by means of the standard-form control equation system derived from the above equation system) a control deviation signal (ra) which completely compensates for the deviation between actual value and set value of the distance (a) from the preselected lane boundary (3). However, so that this takes place only for relatively small steering corrections, and it continues to be possible for the driver to perform relatively large steering interventions, a limiter (6) is provided in the steering controller device (4), which transforms the control deviation signal with upper and lower value limitation, into a steering aid adjustment signal ($wl_r$) that is fed to the electronic four-wheel steering unit (9) as a signal relating to the steering angle setting requested by the control. In this embodiment, the steering angle adjustment signal ($wl_r$) is calculated in the controller unit (5) to effect an additional steering angle adjustment at the rear axle such that the actual distance ($a_{act}$) approaches the set distance ($a_{set}$). In order to carry out this additional steering angle adjustment at the rear axle, it is sufficient in this example to use an electronic four-wheel steering unit (9) of commercially available design, with the electronic control device expanded to include, as an additional input variable, the rear-axle steering angle requested by the steering-aid adjustment signal ($wl_r$), which is to be additionally implemented.

The electronic four-wheel steering unit (9) generates a steering angle setting by combining the steering angle setting requested by the driver and the steering angle setting requested by the control. By limiting the size of the steering angle adjustment signal ($wl_r$) generated by the steering controller device (4), it is ensured that relatively large steering movements requested by the driver, (e.g., when changing lanes) are not eliminated by the control, but rather essentially implemented to the degree requested by the driver. In contrast, the driver is relieved of relatively small steering corrections which are continuously necessary and are reliably performed by the steering control by means of the steering-aid-adjustment signal ($wl_r$).

Since, by making steering movements of relatively large amplitude, the driver retains substantial control of the driving line followed by the vehicle, it would be inexpedient if the steering control were always adjusted to the same set value for the distance ($a_{set}$) to be maintained from a lane marking. It is to be taken into account, for example, that the driver does not always necessarily desire a constant identical driving line (e.g., the centre of a specific lane), as a set course. Thus, the device for vehicle steering and course control according to the invention is equipped with the set lane signal transmitter (8), which adjusts the desired set distance value ($a_{set}$), For this purpose, in each case the sensor (1) provides the actual distance value ($a_{act}$) to the set course signal transmitter (8), which monitors this actual distance value ($a_{act}$) over a prescribed time period (T), and determines the minimum ($a_{min}$) and maximum distance ($a_{max}$) occurring during that time period, as well as the resulting difference ($a_d = a_{max} - a_{min}$). In addition to the time period parameter (T) (typically up to two seconds), for adjusting the previous set distance value ($a_{set}$(old)), a width parameter (E) which is typically set to approximately 15 cm is also prescribed.

The set course signal transmitter (8) maintains the old set distance value if it lies within the window bounded by the lower value ($a_{min} - E$) and the upper value ($a_{max} + E$), while the upper window limit value ($a_{max} + E$) is selected as a new set distance value ($a_{set}$(new)) if the old set distance value ($a_{set}$(old)) lies above the window, and the lower window limit value ($a_{min} - E$) is selected if the old set distance value ($a_{set}$(old)) lies below the window. This relationship is expressed as follows:

$$a_{set}(\text{new}) = \min\{\max[a_{set}(\text{old}), a_{min} - E], a_{max} + E\}$$

wherein "min" represents a function which selects the smaller of the quantities within { }, and "max" represents a function which selects the larger of the quantities within [ ].

In this manner, the set distance value to be prescribed as control variable of the control can be adapted to the preceding driving behavior. The set value ($a_{set}$) for the transverse distance (a) to be determined during each maneuver performed by the driver is changed as a function of the current actual value of the transverse distance ($a_{act}$), and left unchanged only if the driver is already controlling the vehicle in a steady-state manner without relatively large transverse deviation parallel to the direction of the roadway. Furthermore, in order to improve the transition between non-steady-state sections of the journey (e.g., just before, during and just after changing lane), the set course signal transmitter (8) also adapts the initially prescribed parameters (T, E) in a dynamic manner; that is, the two parameters (T, E) are reduced whenever the determined difference ($a_d$) between the minimum and maximum distance ($a_{min}, a_{max}$) exceeds the initial value of the width parameter (E) (e.g., 15 cm) during the prescribed initial time period (T), and the parameters (T, E) are increased if this difference ($a_d$) drops below the initial value (e.g., 15 cm). The reduction in the time period parameter (T) takes place linearly, by one second per second down to zero, and increases by 2 seconds per second up to the value 2. The reduction in the length parameter (E) takes place at 15 cm per second down to zero and the increase at 30 cm per second up to the value 15 cm.

If the control unit (5) receives the information relating to the steering wheel angle (lrw) set by the driver (indicated by a broken line in FIG. 2), the control takes place in such a way that the control deviation signal (ra) is determined based on a full compensation of the driver steering engagement ($wl_r$), i.e., $ra = -wl_r + dra$, (dra) being the actual control deviation signal which becomes zero when the actual distance value and the set distance value correspond. However, the magnitude of the control deviation signal (ra) is limited by the limiter (6) e.g., so that it corresponds to a maximum steering wheel angle of ±3°. In this manner, relatively large steering interventions ($wl_r$) requested by the driver are no longer eliminated by the control; rather they are used to set the steering angle. If, as provided in an alternative embodiment, the information concerning steering wheel angle is not fed to the controller unit (5), the control must be robust in this respect, for which purpose a gliding control must then be used. With such control, plausible estimates are made for specific variables of the differential equation control system as initial values to solve these equations. In particular the steering wheel angle (lrw) set by the driver is best estimated with reference to the measured curvature (kr) of the roadway. With the control deviation signal (ra) acquired in this way, control is then carried out as in the case of the measured steering wheel angle (lrw) which is input to the controller unit (5).

Overall, the device according to FIG. 2 achieves steering control which provides an advantageous uniform transition between driver-controlled and closed-loop controlled steering. The driver retains the ability to intervene for relatively large steering movements, such as for lane changing and avoidance maneuvers, while the small, compensating, course-holding steering movements are reliably carried out by the closed-loop control which, to this end, causes the existing electronic four-wheel steering to carry out an additional adjustment of the steering angle of the rear axle, a dynamic control variable adaptation taking place.

Alternatively, it is possible for a vehicle without existing four-wheel steering to realize a control-induced adjustment intervention directly on the rear axle by arranging an appropriate additional adjustment element, it being possible to use an electromechanical, hydraulic or piezoelectric adjustment element.

Furthermore, it is also possible to split the steering-aid adjustment signal ($wl_r$) into discrete elements. For this purpose the unit (14) (indicated by broken lines in FIG. 2) splits the steering-aid adjustment signal ($wl_r$) preferably into a small number of discrete values so that the corresponding adjustment elements need only be designed to set these few discrete values. Of course, instead of arranging the unit for splitting into discrete elements separately as indicated in FIG. 2, it is also possible to incorporate it into the steering controller device (4), e.g., within the limiter stage (6) or else only within the four-wheel steering unit (9), which constitutes the adjustment unit of the control.

As an alternative to the described use of the steering angle as an adjustment variable, it is also possible to use the steering angle speed (that is, the rate of change of direction) as the adjustment variable. In conjunction with splitting the steering-aid adjustment signal into discrete elements (also possible in this case), it is sufficient, e.g., in a simple embodiment, to be able to set three discrete values for the steering angle speed, e.g., −0.5°/s, 0°/s and 0.5°/s by means of the steering-aid adjustment signal ($wl_r$).

As a further variant of the device described above according to FIG. 2, it is also possible to limit the adjustment variable by means of a limiting device situated on the actuator side, (i.e., in FIG. 2 within the four-wheel steering unit (9)) in addition to, or preferably instead of, the limiter (6), as indicated by the limiting device (13), marked by broken lines, in FIG. 2. This actuator-side limiting device (13) is preferably provided in a constructionally simple way in the form of an adjustment element with corresponding setting range limits. With such an arrangement, steering angle speed can be used, for example, as the adjustment variable, e.g., the above-mentioned three discrete setting values with simultaneous limitation of the control-requested steering angle setting, to, for example, ±0.2°. By ensuring such limit values of the control-requested steering angle setting of e.g., ±0.2° by means of corresponding constructional design of the adjustment elements, reliable system operation is possible without additional measures, since the small control-requested steering angle settings can be overridden at any time by the driver. If, in addition, the adjustment variable is split into strictly discrete elements, the connection between the control device and the actuation means within the four-wheel steering adjustment device (9) and the actuation means themselves can be of simple and robust design.

Figure 3:
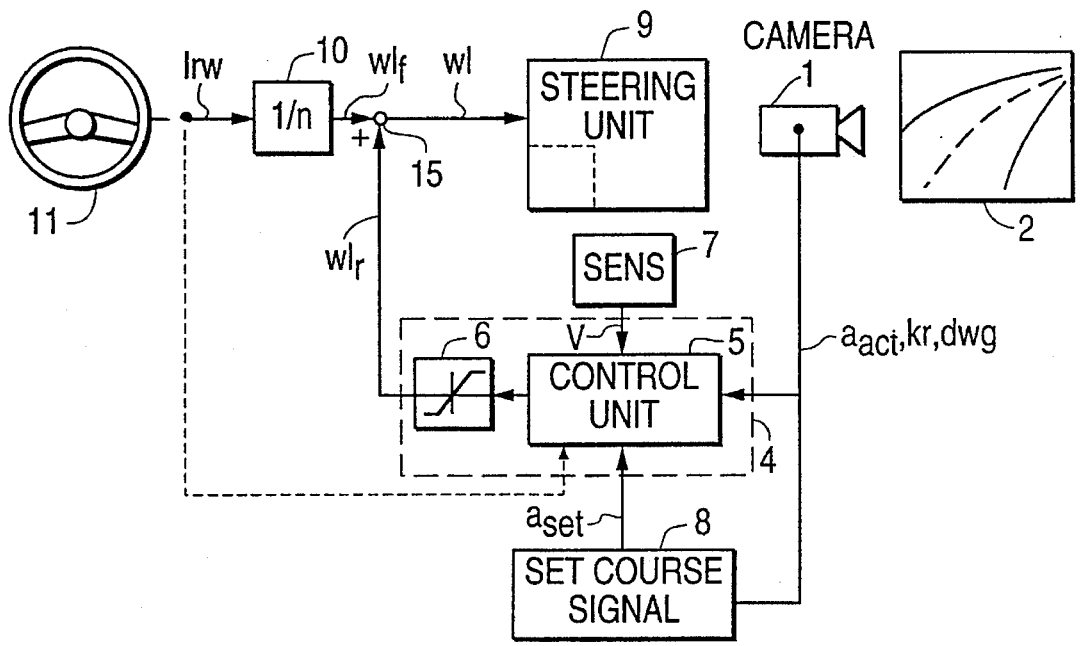
FIG. 3 is a block diagram of a steering control according to the invention, which acts on the steering angle of the front axle.

FIG. 3 shows an example of a course holding vehicle steering device in which both the control-requested and the driver-requested steering intervention takes place at the front axle. Reference symbols in FIG. 3 which are the same as those in FIG. 2 refer to components which are functionally identical to those in FIG. 2. In particular, the production of the driver-requested steering angle setting signal ($wl_f$) and the steering-aid adjustment signal ($wl_r$) which is produced by the steering controller device (4), take place in the same manner as in FIG. 2. The generation of this steering-aid adjustment signal within the steering control device (4) also corresponds completely to the procedure described with respect to the device in FIG. 2, the only exception being that the parameters included in the differential control equations must be adjusted in a known manner to account for the fact that steering intervention is performed on the front axle instead of on the rear axle, and selected suitably.

In contrast with the device in FIG. 2, in the device according to FIG. 3 the steering angle adjustment signal ($wl_f$) produced on the driver's side and the steering-aid adjustment signal ($wl_r$) produced on the controller side are summed in an adder (15) to produce a resulting steering angle adjustment signal (wl). This steering angle adjustment signal (wl) is input to a front-axle steering angle adjustment device (9) which sets the steering angle based on the additive superimposition of the steering angle setting required on the driver's side and the steering angle setting required on the controller side. The set distance value ($a_{set}$) in the embodiment of FIG. 3 is adjusted in the same manner as described in relation to FIG. 2, by virtue of the arrangement of the set course signal transmitter (8).

Instead of adding the steering-aid adjustment signal ($wl_r$) to the driver-generated steering angle adjustment signal ($wl_f$) in the adder (15) which is arranged ahead of the adjustment device (9) as shown in FIG. 3, it is also possible to input the steering-aid adjustment signal ($wl_r$) to the adjustment device (9) separately from the driver-generated steering angle adjustment signal ($wl_f$). In this case, an additional adjustment element for the front axle must be provided within the adjustment device (9) which (by electromechanical or hydraulic adjustment of the steering gear, the track rod or its connection points in addition to the adjustment initiated by the driver via the steering wheel (11)) sets the additional small control-based steering angle in addition to that prescribed by the driver. This additional actuation element can be of very simple construction if the steering-aid adjustment signal is split into discrete elements as described with respect to FIG. 2 above. In this case, it is also possible to limit the controller-induced steering angle adjustment on the actuator side simply by selecting an adjustment element with correspondingly limited adjustment range.

Figure 4:
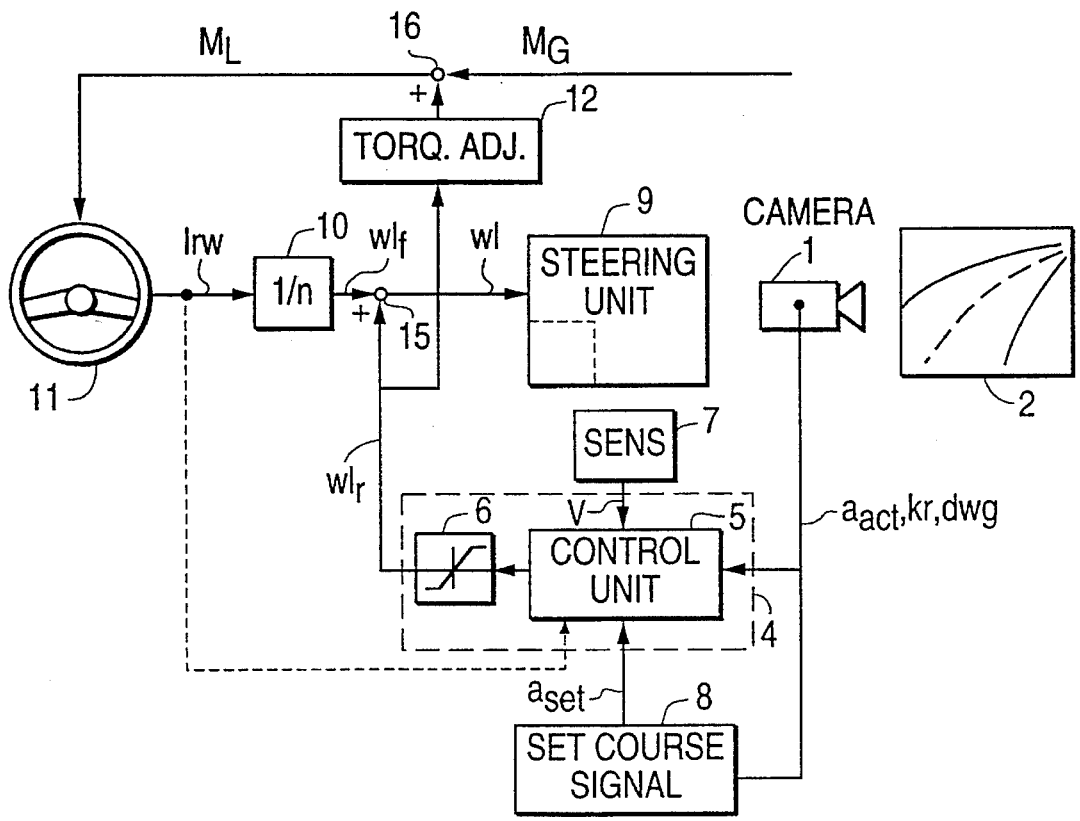
FIG. 4 is a block diagram of a device as in FIG. 3 in which steering torque compensation is additionally provided.

A variant of the embodiment of FIG. 3 is shown in FIG. 4, in which identical reference symbols designate functionally identical elements. The manner of setting the steering angle at the front axle in the device in FIG. 4 corresponds completely to that described with respect to FIG. 3. In addition, in the example in FIG. 4 steering torque compensation is provided. The additional steering angle adjustment based on the steering-aid adjustment signal ($wl_r$) of the control causes a variation of the steering wheel torque which is unexpected for the driver, since a slight adjustment of the steering wheel angle in the same direction as the steering-aid adjustment signal ($wl_r$) does not lead to an effective adjustment of the steering angle; rather it simply causes a control which correspondingly rescinds the value of the steering-aid adjustment signal ($wl_r$). To compensate for this phenomenon, e.g., an additional steering wheel torque is provided by means of a suitable adjustment device (12), which may be, for example, an electric torque meter which acts on the steering column. The steering wheel torque generated in this manner is combined with the steering wheel torque ($M_G$) produced conventionally (by the tires, steering gear or power steering) to yield a resulting steering wheel torque ($M_L$) which conveys to the driver the expected steering sensation.

In the embodiment of FIG. 4, the alternatives and variants described in relation to FIGS. 2 and 3 are also possible. In particular, the steering-aid adjustment signal may be split into discrete elements, and the controller-induced steering angle adjustment may be limited on the actuator side in addition to or instead of providing the limiter within the steering control device. It is of course also possible to use other customary vehicle position sensor arrangements instead of the device for detecting the position of a vehicle which is shown. The main field of application of the steering control device is road vehicles, but the device can also be used for other steered vehicles.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Apparatus for steering and maintaining course of a vehicle, of the type having a position sensor 1 for detecting position of the vehicle in relation to a roadway; a between the position of the vehicle detected by the position sensor and a prescribed set vehicle position, and emits a steering-aid adjustment signal and a steering angle adjustment device 9 for adjusting a steering angle of the vehicle in response to the steering-aid adjustment signal; wherein:

a limiter unit coupled to an output of said steering control device limits a steering angle adjustment requested by the steering control device to predetermined upper and lower limits; and the steering angle adjustment device is coupled to receive a driver-requested steering angle adjustment signal from a driver operated steering angle input device, and sets a steering angle of the vehicle by combining the steering angle adjustment requested by the steering control device and the steering angle adjustment requested by the driver, whereby an output of said steering angle adjustment device is limited in a predeterminable manner.

2. Apparatus according to claim 1, wherein said position sensor determines values of actual distance (a) of the vehicle from a marked lane boundary, curvature of the lane boundary and an angle between a longitudinal axis of the vehicle and a tangent to the lane boundary; and wherein the prescribed set vehicle position is a set distance from the lane boundary.

3. Apparatus according to claim 2 further comprising a set course signal transmitter for adjusting the set distance as a function of the actual distance detected during a predetermined time period.

4. Apparatus according to claim 3, wherein said set course signal transmitter comprises means for reducing an initial time period parameter and a prescribed permitted distance fluctuation range in response to large fluctuations in the actual distance, and for increasing said initial time period parameter and said prescribed distance fluctuation range in response to small fluctuations in the actual distance.

5. Apparatus according to claim 4 further comprising a device for splitting the steering-aid adjustment signal into a small number of discrete values.

6. Apparatus according to claim 4, wherein the steering angle adjustment is performed by means of a front-axle steering angle adjustment device on a front axle of a vehicle, in response to an additive combination of the steering angle setting requested by the driver and of the steering angle setting requested by the steering control device.

7. Apparatus according to claim 4, further comprising a device coupled to receive an output from said steering control device, for steering torque compensation of said steering angle input device of the vehicle in response to the steering-aid adjustment signal.

8. Apparatus according to claim 1 further comprising a device coupled to receive an output from said steering control device, for splitting the steering-aid adjustment signal into a small number of discrete values.

9. Apparatus according to claim 1, wherein the steering angle adjustment is performed by means of a front-axle steering angle adjustment device on a front axle of a vehicle, in response to an additive combination of the steering angle setting requested by the driver and of the steering angle setting requested by the steering control device.

10. Apparatus according to claim 9, further comprising a device coupled to receive an output from said steering control device, for steering torque compensation of said steering angle input device of the vehicle in response to the steering-aid adjustment signal.

11. Apparatus according to claim 1, further comprising a device coupled to receive an output from said steering control device, for steering torque compensation of said steering angle input device of the vehicle in response to the steering-aid adjustment signal.

12. Apparatus according to claim 1 further comprising an electronic four-wheel steering unit coupled to receive the steering angle settings requested by the driver and by the steering control device and to perform, in accordance with the steering-aid adjustment signal, an additional rear-axle steering angle adjustment requested by the steering control device.

* * * * *